(12) United States Patent
Kim

(10) Patent No.: US 8,379,284 B2
(45) Date of Patent: Feb. 19, 2013

(54) MICRO SHUTTER DEVICE AND METHOD OF MANUFACTURING THE SAME

(75) Inventor: Che-heung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 12/537,743

(22) Filed: Aug. 7, 2009

(65) Prior Publication Data

US 2010/0118373 A1    May 13, 2010

(30) Foreign Application Priority Data

Nov. 10, 2008  (KR) .......................... 10-2008-111005

(51) Int. Cl.
*G02B 26/02* (2006.01)
(52) U.S. Cl. ...................................................... 359/231
(58) Field of Classification Search .................. 359/230, 359/231, 234, 237, 324; 349/66, 110–111; 877/742–752
See application file for complete search history.

(56) References Cited

U.S. PATENT DOCUMENTS

| | | | | |
|---|---|---|---|---|
| 3,553,364 | A * | 1/1971 | Lee | 359/230 |
| 4,810,058 | A * | 3/1989 | Sangyoji et al. | 349/2 |
| 6,396,620 | B1 * | 5/2002 | Goodwin-Johansson | 359/292 |
| 6,963,330 | B2 | 11/2005 | Sugahara et al. | |
| 2002/0180306 | A1 * | 12/2002 | Hunt et al. | 310/302 |
| 2006/0033938 | A1 * | 2/2006 | Kopf et al. | 358/1.7 |
| 2006/0187530 | A1 | 8/2006 | Hagood et al. | |
| 2007/0159679 | A1 | 7/2007 | Hagood et al. | |
| 2008/0158635 | A1 * | 7/2008 | Hagood et al. | 359/230 |
| 2008/0174532 | A1 * | 7/2008 | Lewis | 345/85 |

FOREIGN PATENT DOCUMENTS

| | | |
|---|---|---|
| EP | 1 089 110 A2 | 4/2001 |
| KR | 2001-0070054 A | 7/2001 |
| KR | 10-2008-0021958 A | 3/2008 |

* cited by examiner

*Primary Examiner* — Stephone Allen
*Assistant Examiner* — Kimberly N Kakalec
(74) *Attorney, Agent, or Firm* — Sughrue Mion, PLLC

(57) ABSTRACT

A micro shutter device and a method of manufacturing the same are provided. A barrier is provided to define a unit pixel. Film actuators are formed within the unit pixel. The film actuators are configured to be bent in opposite directions to each other from a substrate so that light passing through the substrate from an external light source is blocked in a voltage non-applied state, and to be straightened perpendicularly to the substrate so that the light is transmitted upon voltage application. Accordingly, it is possible to increase the aperture ratio and thus improve the light efficiency. Furthermore, it is possible to reduce voltage necessary to drive the film actuators and thus increase the drive speed.

18 Claims, 7 Drawing Sheets

US 8,379,284 B2

MICRO SHUTTER DEVICE AND METHOD OF MANUFACTURING THE SAME

CROSS-REFERENCE TO RELATED APPLICATION

This application claims benefit under 35 U.S.C. §119(a) of Korean Patent Application No. 10-2008-111005, filed on Nov. 10, 2008, the disclosure of which is incorporated by reference in its entirety for all purposes.

BACKGROUND

1. Field

The following description relates to a micro shutter device and a method of manufacturing the same and, more particularly, to a micro shutter device for use in a display or an optical switching device, and a method of manufacturing the same.

2. Description of the Related Art

A liquid crystal display (LCD) exhibits excellent visibility, low power consumption and low heat dissipation compared to a cathode ray tube (CRT). Accordingly, LCD is increasingly popular as a future generation display for a cellular phone, a computer or a television, together with a plasma display panel (PDP) and a field emission display (FED).

LCD displays an image by selectively transmitting light from a light source such as a backlight. More specifically, voltage applied to liquid crystal causes molecular orientation of liquid crystal to be changed. Liquid crystal serves as a light shutter to selectively transmit light using the change in molecular orientation. However, since it is not possible to block light only with the liquid crystal, polarizing films are further provided on the front and rear of the liquid crystal to transmit light only in limited directions.

The LCD thus configured is known to substantially transmit only about 6 to 8% of light from a backlight due to light losses in the liquid crystal and the polarizing films, resulting in low light efficiency.

In order to solve the above-mentioned problem, a micro shutter device has been developed which uses a micro electro mechanical system (MEMS), rather than removing the liquid crystal and the polarizing films.

SUMMARY

The following description relates to a micro shutter device which is configured to increase an aperture ratio to improve light efficiency, reduce voltage applied to drive film actuators, and quickly drive the film actuators, and a method of manufacturing the same.

In one general aspect, a micro shutter device includes a transparent substrate; a transparent substrate; a barrier to define a unit pixel on the substrate; and a pair of film actuators formed within the unit pixel to be bent in opposite directions to each other from the substrate so that light passing through the substrate from an external light source is blocked in a voltage non-applied state, and to be straightened perpendicularly to the substrate so that the light is transmitted upon voltage application.

In another general aspect, a method of manufacturing a micro shutter device includes forming first and second electrodes on a transparent substrate; forming a sacrificial wall on the substrate to partially overlap with the first electrode; forming a film actuator on a side of the sacrificial wall and the first electrode, the film actuator being bent toward the sacrificial wall if the sacrificial wall is removed; forming a sacrificial separation layer on a side of the film actuator; forming another film actuator on a side of the sacrificial separation layer and the second electrode, the film actuator being bent in an opposite direction to the sacrificial separation layer if the sacrificial separation layer is removed; removing the sacrificial wall and the sacrificial separation layer; and forming a barrier on the substrate to define a unit pixel.

However, other aspects will be apparent from the following description, the drawings, and the claims.

BRIEF DESCRIPTION OF THE DRAWINGS

Throughout the drawings and the detailed description, unless otherwise described, the same drawing reference numbers refer to the same elements, aspects, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures are omitted to enhance clarity and conciseness.

Figure 1:
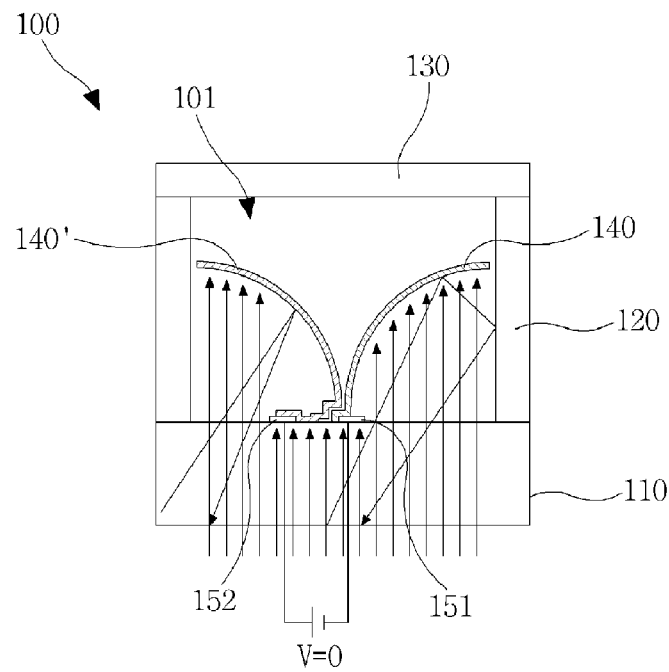
FIG. 1 is a cross-sectional view of a micro shutter device according to a first exemplary embodiment of the present invention.
Figure 2:
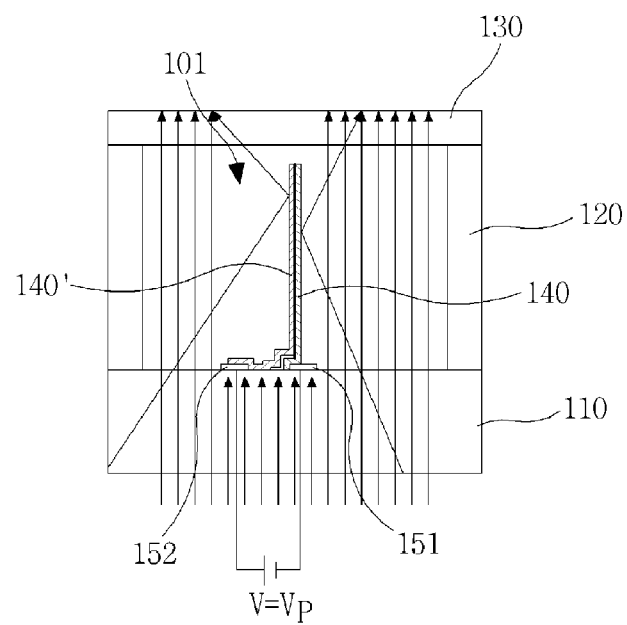
FIG. 2 is a cross-sectional view showing how film actuators operate upon voltage application in FIG. 1.

FIG. 1 is a cross-sectional view of a micro shutter device according to a first exemplary embodiment of the present invention. FIG. 2 is a cross-sectional view showing how film actuators operate upon voltage application in FIG. 1.

A micro shutter device 100 includes a substrate 110, a barrier 120 and a pair of film actuators 140 and 140'.

The substrate 110 is made of a transparent material to transmit light from an external light source, such as a backlight. The transparent material includes glass, for example.

The barrier 120 is formed on the substrate 110 to define a unit pixel 101. In a display employing the micro shutter device 100, a number of the barrier 120 may be configured to divide the substrate into multiple unit cells 101 to form an image. The barrier 120 may be made of dielectric material. A cover 130 made of a transparent material, such as glass, may be provided over the barrier 120 to cover the unit pixel 101.

A pair of film actuators 140 and 140' are formed in the unit pixel 101. As shown in FIG. 1, the film actuators 140 and 140' are configured to be bent in opposite directions to each other in a voltage-unapplied state, thereby blocking light passing through the substrate 110. As shown in FIG. 2, the film actuators 140 and 140' are aligned to be perpendicular to the substrate 110 upon voltage application, thereby transmitting the light. First and second electrodes 151 and 152 may be formed on the substrate 110 so that voltage may be applied to the film actuators 140 and 140'.

The first and second electrodes 151 and 152 are formed on the substrate 110 to be connected to the film actuators 140 and 140', respectively. When a predetermined voltage, for example, a pull-in voltage of Vp, or higher is applied between the first and second electrodes 151 and 152, the film actuators 140 and 140' are straightened out to be perpendicular to the substrate 110 due to electrostatic force created between the film actuators 140 and 140', thereby transmitting the light.

This would thus allow an aperture ratio of about 75% or more. The term aperture ratio is defined to be the ratio of a light transmitting area with respect to a unit pixel 101. Accordingly, a higher aperture ratio can result in a higher light efficiency. This may be applied to all types of backlights in form of scattered light or collimated light. Furthermore, regardless of the type of backlight, a high contrast ratio may be obtained.

If the voltage is no longer applied between the first and second electrodes 151 and 152, the electrostatic force created between the film actuators 140 and 140' disappears and thus the film actuators 140 and 140' elastically revert to the original position and block the light again.

That is, since the film actuators 140 and 140' are transformed depending on the voltage applied so as to transmit or block the light, it is possible to increase light efficiency with little light loss, compared to a case where liquid crystal and polarizing films are used to transmit or block light.

The first and second electrodes 151 and 152 may be made of transparent material such as ITO (indium tin oxide) to increase the aperture ratio. If the electrodes are made of non-transparent material and disposed at the center of the unit pixel 101, the aperture ratio may decrease.

The respective lower ends of the film actuators 140 and 140' may be fixed to the substrate 110 at the center of the unit pixel 101. The film actuators 140 and 140' may be formed to be bent from the center of the unit pixel 101 toward both edges of the unit pixel 101. The film actuators 140 and 140' may be formed to closely contact at each other's facing sides when they are straightened out to be perpendicular to the substrate 110. In this case, the light is only blocked in a range of a thickness of the film actuators 140 and 140', thereby increasing the aperture ratio.

Each of the film actuators 140 and 140' covers a half of the entire opening of the unit pixel 101. Hence, compared to a single roll type film actuator covering the entire opening of the unit pixel, the radius of curvature of each film actuator is larger with respect to the same length. As a result, an initial electrostatic capacitance may significantly increase, which may not only function to reduce a drive voltage but increase the aperture ratio.

Furthermore, the film actuators 140 and 140' may be operated at a lower drive voltage and at a higher drive speed when the film actuators 140 and 140' are bent in a voltage-unapplied state and then straightened out upon voltage application, compared to vice versa.

Figure 3:
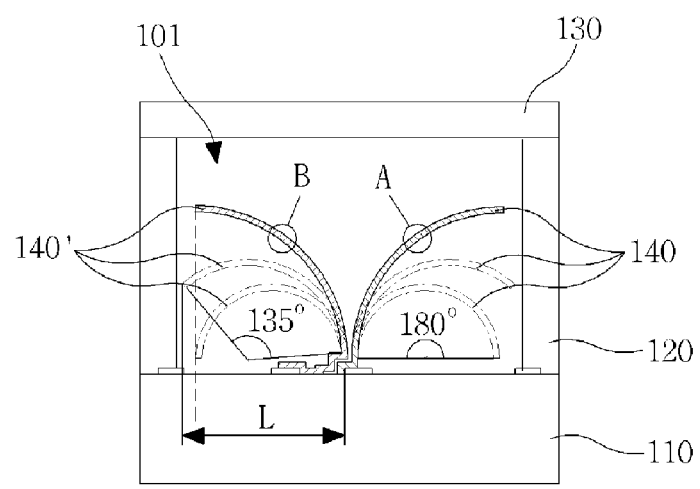
FIG. 3 illustrates a change in length of a shadow depending on a central angle of an arc of a film actuator in FIG. 1.

The film actuators 140 and 140' may each be bent with a predetermined radius of curvature so that a central angle of an arc of each film actuator is 135°. In this case, as shown in FIG. 3, the film actuator's shadow length L is the longest, which maximizes light-blocking effect.

Referring back to FIG. 3, the film actuators 140 and 140' may each be bent such that the central angle of an arc of each film actuator is 180°. In this case, the unfixed ends of the film actuators 140 and 140' may be located as close as possible to the substrate 110, thereby minimizing light leakage between the film actuators 140 and 140' and the barrier 120.

Figure 4:
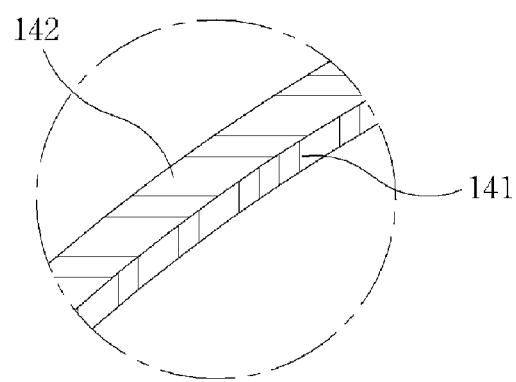
FIGS. 4 and 5 are enlarged views of stacked film actuators indicated by A and B in FIG. 3.
Figure 5:
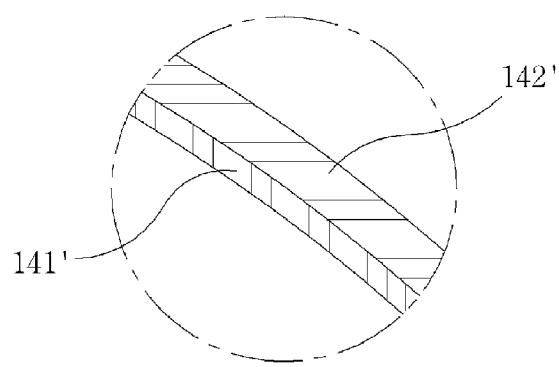

The film actuators 140 and 140' may be formed of two layers with different residual stresses. For instance, as shown in FIGS. 4 and 5, the film actuators 140 and 140' may include electrode layers 141 and 141' and insulating layers 142 and 142' layered on the electrode layers 141 and 141', respectively. The electrode layers 141 and 141' are connected to the first and second electrodes 151 and 152, respectively, creating electrostatic force between the film actuators 140 and 140'. The electrode layers 141 and 141' may be made of conductive material. The electrode layers 141 and 141' may be made of non-transparent material so that light may not pass through the film actuators 140 and 140'.

The insulating layers 142 and 142' insulate the film actuators 140 and 140' from each other when the film actuators 140 and 140' contact each other. The insulating layers 142 and 142' are made of insulating material and placed to face each other. The insulating layers 142 and 142' may be made of non-transparent material so that light may not pass through the film actuators 140 and 140'.

The electrode layers 141 and 141' may have tensile residual stress. The insulating layers 142 and 142' may have compressive residual stress, no residual stress, or tensile residual stress less than the electrode layers 141 and 141'. The film actuators 140 and 140' may thus be bent.

The radius of curvature of the film actuators 140 and 140' may be adjusted by controlling a difference in residual stress between the electrode layers 141 and 141' and the insulating layers 142 and 142'. For example, assuming that the electrode layers 141 and 141' have the same tensile residual stress, the film actuators 140 and 140' have a greater radius of curvature when the insulating layers 142 and 142' have tensile residual stress less than the electrode layers 141 and 141' than when the insulating layers 142 and 142' have no residual stress, and have a greater radius of curvature when the insulating layers 142 and 142' have no residual stress than when the insulating layers 142 and 142' have compressive residual stress.

The radius of curvature of each of the film actuators 140 and 140' is a major factor in determining the thickness of the micro shutter device 100. Thus, a shorter radius of curvature of each of the film actuators 140 and 140' may be beneficial in manufacturing a thinner micro shutter device 100.

Figure 6:
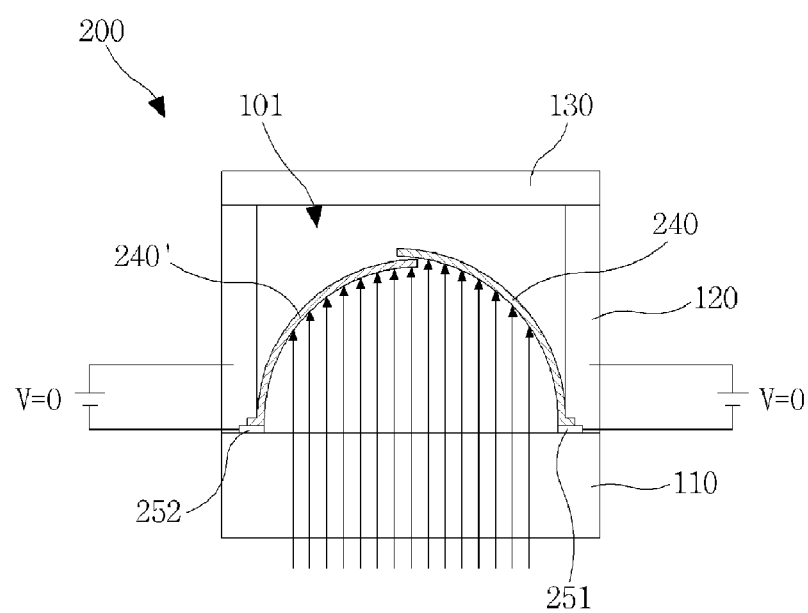
FIG. 6 is a cross-sectional view of a micro shutter device according to a second exemplary embodiment of the present invention.
Figure 7:
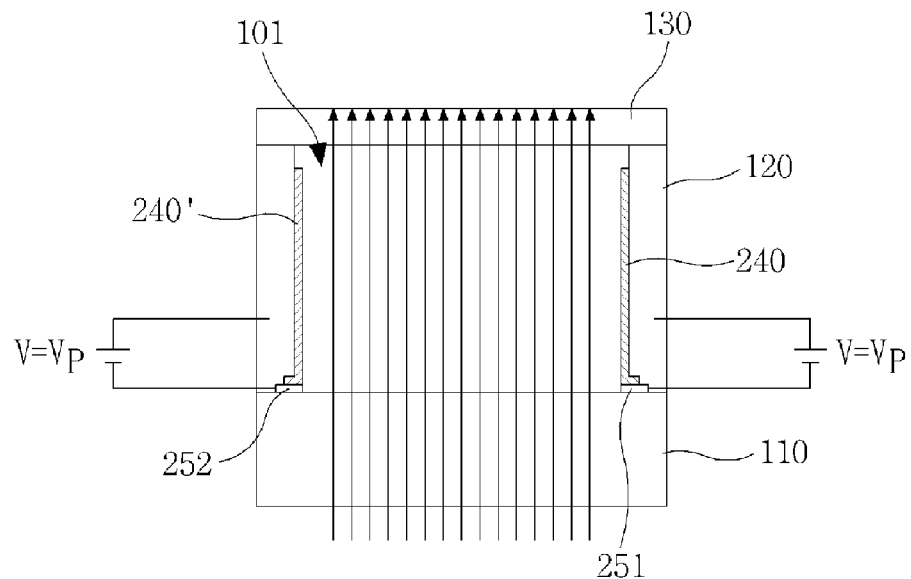
FIG. 7 is a cross-sectional view showing how film actuators operate upon voltage application in FIG. 6.

FIG. 6 is a cross-sectional view of a micro shutter structure according to a second exemplary embodiment of the present invention. FIG. 7 is a cross-sectional view showing how film actuators operate upon voltage application in FIG. 6. Like reference numerals in the drawings denote like elements and a detailed description thereof will thus be omitted.

Referring to FIGS. 6 and 7, in a micro shutter device 200 according to the present exemplary embodiment, lower ends of film actuators 240 and 240' are fixed to the substrate 110 at both edges of the unit pixel 101. The film actuators 240 and 240' are each formed to be bent from both edges of the unit pixel 101 toward the center of the unit pixel 101.

As shown in FIG. 6, the film actuators 240 and 240' are kept bent from the substrate 110 in a voltage-unapplied state so as to block light. As shown in FIG. 7, the film actuators 240 and 240' are straightened out to be perpendicular to the substrate 110 upon voltage application, thereby transmitting the light. The film actuators 240 and 240' may overlap each other at their unfixed ends so that the light may not leak from between the unfixed ends.

First and second electrodes 251 and 252 are formed to be connected to the film actuators 240 and 240', respectively. The first and second electrodes 251 and 252 may be formed below the barrier 120 to increase the aperture ratio. A pull-in voltage of Vp or higher applied between the first electrode 251 and the barrier 120 and between the second electrode 252 and the barrier 120 causes electrostatic force between the film actuators 240 and 240'. The film actuators 240 and 240' are then straightened out to be perpendicular to the barrier 120 due to the electrostatic force, thereby transmitting the light.

In the event the voltage is no longer applied between the first electrode 251 and the barrier 120 and between the second electrode 252 and the barrier 120, the electrostatic force disappears between the film actuators 240 and 240' and the film actuators 240 and 240' are thus elastically reverted to the original position. The film actuators 240 and 240' may be formed to closely contact the barrier 120 when the film actuators 240 and 240' are straightened out to be perpendicular to the substrate. In this case, the light is only blocked in a range of a thickness of the film actuators 240 and 240', thereby increasing the aperture ratio. Furthermore, the film actuators 240 and 240' may be formed of two layers of different residual stresses, similarly to the film actuators 140 and 140' described in the first exemplary embodiment.

A method for manufacturing the micro shutter device 100 according to the first exemplary embodiment of the present invention will be described with reference to FIGS. 8 to 14.

Figure 8:
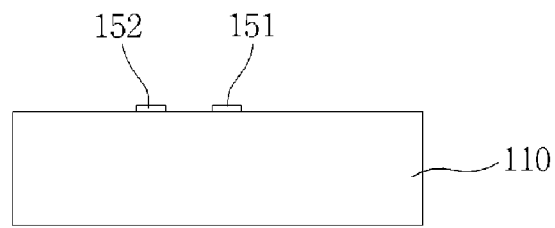
FIGS. 8 to 14 illustrate a method of manufacturing a micro shutter device according to a first exemplary embodiment of the present invention.

Referring to FIG. 8, the first and second electrodes 151 and 152 are formed on the transparent substrate 110. The first and second electrodes 151 and 152 may be formed near the center of a region to be defined as the unit pixel 101. The first and second electrodes 151 and 152 may be made of transparent material, such as ITO, to increase the aperture ratio.

Figure 9:
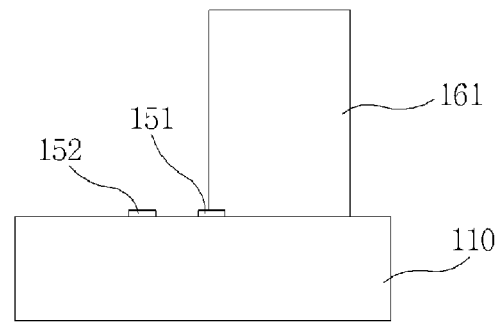

Referring to FIG. 9, a sacrificial wall 161 is formed on the substrate 110. The sacrificial wall 161 will be removed after the film actuators 140 and 140' are formed. The sacrificial wall 161 is formed to partially overlap with the first electrode 151. The sacrificial wall 161 is formed such that its side close to the first electrode 151 is perpendicular to the substrate 110.

Figure 10:
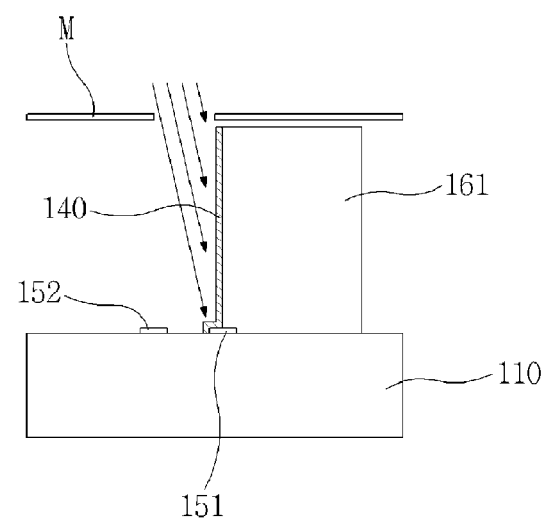

Referring to FIG. 10, a film actuator 140 is formed on the sacrificial wall 161. The film actuator 140 may be formed on one side of the sacrificial wall 161 and the first electrode 151 using a shadow mask M. The film actuator 140 is formed to be bent toward the sacrificial wall 161 if the sacrificial wall 161 is removed.

For example, the electrode layer is deposited on the side of the sacrificial wall 161, and an insulating layer is then deposited on one side of the electrode layer. At this time, the electrode layer may be deposited to have tensile residual stress. Furthermore, the insulating layer may be formed to have compressive residual stress, no residual stress, or tensile residual stress less than the electrode layer.

Figure 11:
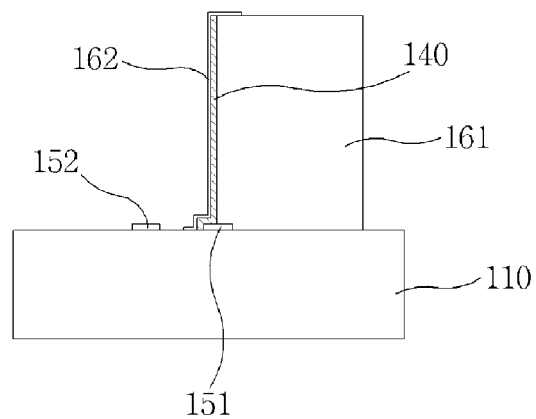

Referring to FIG. 11, a sacrificial separation layer 162 is formed on a side of the film actuator 140. The sacrificial separation layer 162 serves to separate the film actuator 140 from another film actuator 140'. The sacrificial separation layer 162 is removed after the film actuators 140 and 140' are formed.

Figure 12:
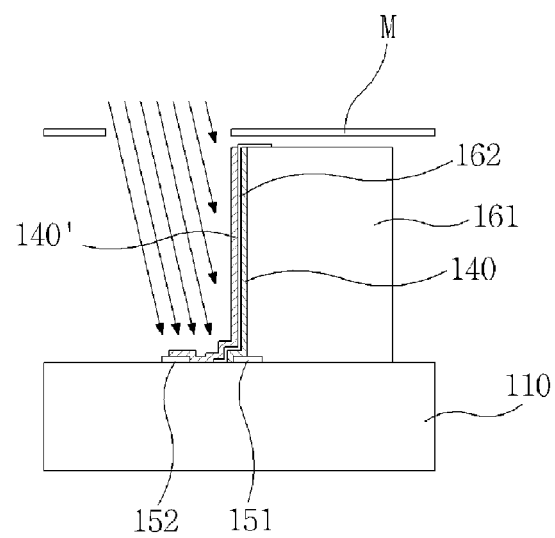

Referring to FIG. 12, another film actuator 140' is formed on the sacrificial separation layer 162. The film actuation 140' may be formed on one side of the sacrificial separation layer 162 and the second electrode layer 152 using a pattern mask M. The film actuator 140' is formed to be bent toward the opposite side of the sacrificial separation layer 162 after the sacrificial separation layer 162 is removed.

For example, an insulating layer is deposited on one side of the sacrificial wall 162, and the electrode layer is then deposited on a side of the insulating layer. At this time, the insulating layer may be formed to have compressive residual stress, no residual stress, or tensile residual stress. The electrode layer is then deposited to have tensile residual stress. If the insulating layer has tensile residual stress, the electrode layer is formed to have tensile residual stress greater than the insulating layer.

Figure 13:
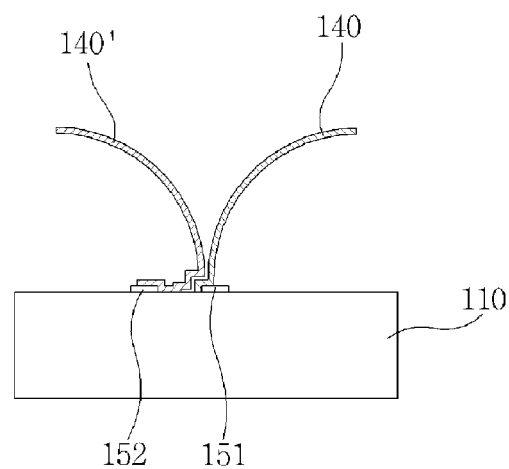
Figure 14:
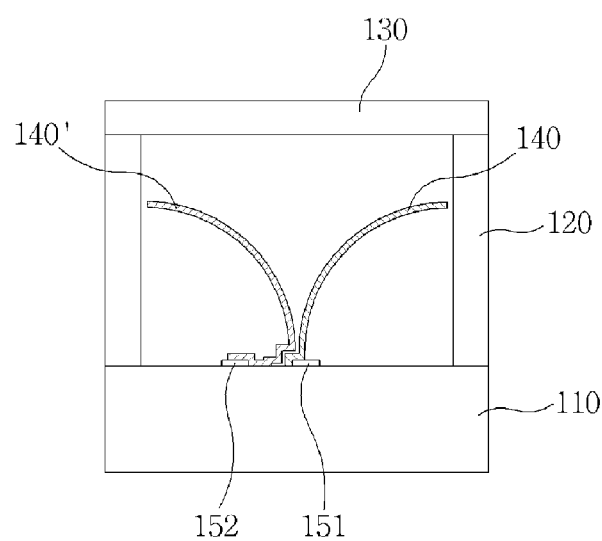

Referring to FIG. 13, the sacrificial wall 161 and the sacrificial separation layer 162 are removed, for example, by a dry release method. Referring to FIG. 14, the barrier 120 is formed on the substrate 110 to define the unit pixel 101. The transparent cover 130 is provided on the barrier 120 to cover the unit pixel 101.

The micro shutter device 200 according to the second exemplary embodiment of the present invention may also be manufactured in a manner similar to the above-mentioned method. However, the sacrificial separation layer 162 may not be provided.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A micro shutter device comprising:
 a transparent substrate;
 a barrier defining a unit pixel on the transparent substrate; and
 a pair of film actuators formed within the unit pixel which are bent in opposite directions to each other from the transparent substrate so that light passing through the transparent substrate from an external light source is blocked in a voltage non-applied state, and which are straightened out to be perpendicular to the transparent substrate so that the light is transmitted in a voltage applied state,
 wherein each of the pair of film actuators comprises two layers with different residual stresses.

2. The micro shutter device of claim 1, wherein the pair of film actuators are fixed at lower ends to the transparent substrate and are formed to be bent from a center of the unit pixel toward both edges of the unit pixel.

3. The micro shutter device of claim 2, wherein the pair of film actuators are formed such that facing sides of the pair of film actuators closely contact each other when the pair of film actuators are straightened out to be perpendicular to the transparent substrate.

4. The micro shutter device of claim 3, wherein a first electrode and a second electrode are formed on the transparent substrate to be and are connected to the pair of film actuators, and voltage is applied between the first electrode and the second electrode.

5. The micro shutter device of claim 4, wherein the first and the second electrodes are made of transparent material.

6. The micro shutter device of claim 3, wherein each of the pair of film actuators is bent with a predetermined radius of curvature so that a central angle of an arc of each of the pair of film actuators is 135°.

7. The micro shutter device of claim 3, wherein each of the pair of film actuators is bent with a predetermined radius of curvature so that a central angle of an arc of each of the pair of film actuators is 180°.

8. The micro shutter device of claim 1, wherein the pair of film actuators are fixed at lower ends to the transparent substrate and are formed to be bent from both edges of the unit pixel toward a center of the unit pixel.

9. The micro shutter device of claim 8, wherein each of the pair of film actuators is formed to closely contact a side of the barrier when each of the pair of film actuators is straightened out to be perpendicular to the transparent substrate.

10. The micro shutter device of claim 9, wherein a first electrode and a second electrode are formed on the transparent substrate and connected to the pair of film actuators, and voltage is applied between the first electrode and the barrier and between the second electrode and the barrier.

11. The micro shutter device of claim 9, wherein the pair of film actuators overlap each other at unfixed ends.

12. The micro shutter device of claim 1, wherein each of the pair of film actuators comprises an electrode layer having tensile residual stress and an insulating layer which is layered on the electrode layer and has compressive residual stress.

13. The micro shutter device of claim 1, wherein each of the pair of film actuators comprises an electrode layer having tensile residual stress and an insulating layer which is layered on the electrode layer and has no residual stress.

14. The micro shutter device of claim 1, wherein each of the pair of film actuators comprises an electrode layer having tensile residual stress and an insulating layer which is layered on the electrode layer and has tensile residual stress less than the electrode layer.

15. The micro shutter device of claim 1, wherein the pair of film actuators are made of non-transparent material.

16. The micro shutter device of claim 1, wherein each of the pair of film actuators comprises an electrode layer having tensile residual stress and an insulating layer which has compressive residual stress.

17. The micro shutter device of claim 1, wherein each of the pair of film actuators comprises an electrode layer having tensile residual stress and an insulating layer which has no residual stress.

18. The micro shutter device of claim 1, wherein each of the pair of film actuators comprises an electrode layer having tensile residual stress and an insulating layer which has tensile residual stress less than the electrode layer.

* * * * *